United States Patent
Morris (10) Patent No.: US 8,459,965 B2
(45) Date of Patent: Jun. 11, 2013

(54) PRODUCTION TUBING MEMBER WITH AUXILIARY CONDUIT

(76) Inventor: Collin Morris, Lloydminster (CA)

( * ) Notice: Subject to any disclaimer, the term of this patent is extended or adjusted under 35 U.S.C. 154(b) by 359 days.

(21) Appl. No.: 12/682,194

(22) PCT Filed: Oct. 16, 2008

(86) PCT No.: PCT/CA2008/001840
§ 371 (c)(1),
(2), (4) Date: Apr. 8, 2010

(87) PCT Pub. No.: WO2009/049420
PCT Pub. Date: Apr. 23, 2009

(65) Prior Publication Data
US 2010/0247345 A1 Sep. 30, 2010

Related U.S. Application Data

(60) Provisional application No. 60/980,577, filed on Oct. 17, 2007.

(51) Int. Cl.
F04B 39/00 (2006.01)
F04B 53/00 (2006.01)
F04B 23/00 (2006.01)

(52) U.S. Cl.
USPC ............ 417/313; 138/115; 138/116; 138/117

(58) Field of Classification Search
USPC ............... 417/904, 313; 166/73, 72; 138/115, 138/116, 117
See application file for complete search history.

(56) References Cited

U.S. PATENT DOCUMENTS

| 2,122,335 A | * | 6/1938 | Berman et al. ........... 156/244.14 |
| 3,871,734 A | | 3/1975 | Murtland |
| 4,336,415 A | | 6/1982 | Walling |
| 4,374,530 A | * | 2/1983 | Walling ........................ 138/110 |
| 4,406,598 A | * | 9/1983 | Walling ........................ 417/404 |
| 4,570,705 A | * | 2/1986 | Walling ....................... 166/77.2 |
| 5,285,008 A | | 2/1994 | Sas-Jaworsky et al. |
| 5,285,204 A | | 2/1994 | Sas-Jaworsky |
| 5,553,666 A | | 9/1996 | Hartman |
| 5,913,337 A | | 6/1999 | Williams et al. |
| 6,192,983 B1 | | 2/2001 | Neuroth et al. |

(Continued)

FOREIGN PATENT DOCUMENTS
EP 505815 9/1992

Primary Examiner — Charles Freay
Assistant Examiner — Joseph Herrmann
(74) Attorney, Agent, or Firm — Ryan W. Dupuis; Kyle R. Satterthwaite; Ade + Company, Inc.

(57) ABSTRACT

A tubing member for use in well operations comprises a solid core extruded casing surrounding a production tubing passage arranged to receive produced fluids from a well therethrough and one or more auxiliary conduits arranged for communicate with well equipment. The casing is rectangular in cross section having a pair of opposed flat sides which can be wound onto a spool such that the flat sides are parallel to an axis of rotation of the spool. A longitudinal extending central axis of the production tubing and of each auxiliary conduit are situated spaced apart from one another along a common diametrical axis arranged to be parallel to the flat sides of the casing and the spool axis. The unitary casing provides good protection for electrical lines, hydraulic lines and other communication lines in the conduits alongside production tubing in a low cost and easy to manufacture tubing member.

14 Claims, 9 Drawing Sheets

| U.S. PATENT DOCUMENTS | | | | | |
|---|---|---|---|---|---|
| 6,296,066 | B1 | 10/2001 | Terry et al. | | |
| 6,555,752 | B2 * | 4/2003 | Dalrymple et al. ....... 174/102 R | | |
| 6,604,550 | B2 | 8/2003 | Quigley et al. | | |
| 6,706,348 | B2 | 3/2004 | Quigley et al. | | |
| 6,857,486 | B2 | 2/2005 | Chitwood et al. | | |
| 2003/0181085 | A1 | 9/2003 | Restarick et al. | | |

* cited by examiner

PRODUCTION TUBING MEMBER WITH AUXILIARY CONDUIT

This application claims priority from U.S. provisional application Ser. No. 60/980,577, filed Oct. 17, 2007.

FIELD OF THE INVENTION

The present invention relates to a tubing member for using in well operations, for example for communication with or control of a downhole submersible pump. Furthermore, the present invention relates to a method of deploying a pump, for example ESP's (Electrical Submersible pumps), HSP's (Hydraulic Submersible pumps), jet pumps, or other artificial lift equipment, into an existing live well bore, utilizing a continuous, plastic and/or metal umbilical tubing member having a production passage therethrough and at least one auxiliary conduit extending therethrough.

BACKGROUND

In the field of oil and gas production, ESP's (electrical submersible pumps) and HSP's (hydraulic submersible pumps) are commonly used to evacuate well bore fluids from oil and gas wells. Submersible pumps come in various sizes and capabilities. The Submersible pump is typically connected to the bottom of a conventional jointed threaded and coupled tubing. Then, in the case of an ESP, as the tubing is inserted into the well bore, the electrical cable comes off a spooler and is strapped to the side of the jointed pipe as it is inserted into the well bore. Hydraulic fluid lines can be similarly strapped to the side of jointed pipe in the case of an HSP.

The conventional system of deployment of ESP's requires heavily armoured cable as it is often exposed to significant wear as it rubs between the casing and tubing during deployment. This type of deployment is slow, and expensive.

The following prior art documents illustrate various examples of tubing for use in well operations. US patent application 2003/0181085 belonging to Restarick et al., U.S. Pat. No. 3,871,734 belonging to Murtland, U.S. Pat. No. 4,336,415 belonging to Walling, U.S. Pat. No. 6,192,983 belonging to Neuroth et al., U.S. Pat. No. 6,857,486 belonging to Chitwood et al., U.S. Pat. No. 6,706,348 belonging to Quigley et al., U.S. Pat. No. 6,296,066 belonging to Terry et al., U.S. Pat. No. 5,913,337 belonging to Williams et al., U.S. Pat. No. 5,553,666 belonging to Hartman, U.S. Pat. No. 5,285,204 belonging to Sas-Jawrosky, and U.S. Pat. No. 5,285,008 belonging to Sas-Jaworsky et al.

In general, prior art attempts to include multiple conduits in a composite tubing member requires the conduits to be formed in a spiral pattern to balance tension in the longitudinal direction of the tubing and/or requires a complex manufacturing process of forming the tubing in layers wrapped about one another. Accordingly prior art attempts to form tubing members with multiple functions remain costly and impractical in many situations.

SUMMARY OF THE INVENTION

According to one aspect of the invention there is provided a tubing member for use in well operations, the tubing member comprising:

a unitary casing extending in a longitudinal direction of the tubing member;

a production tubing passage formed in the casing to extend therethrough in the longitudinal direction and being arranged for receiving production fluids therethrough; and at least one auxiliary conduit formed in the casing separate from the production tubing passage, said at least one auxiliary conduit extending through the casing in the longitudinal direction and being arranged for receiving an auxiliary line therethrough.

According to a second aspect of the present invention there is provided a method of forming a tubing member for use in well operations, the method comprising:

providing production tubing arranged to receive produced fluids from a well therethrough;

providing at least one auxiliary conduit arranged to receive an auxiliary line for communication with or control of well equipment;

extruding a body of material integrally about the production tubing and said at least one auxiliary conduit to form an unitary casing surrounding the production tubing and said at least one auxiliary conduit and extending in a longitudinal direction of the production tubing.

By providing a unitary casing locating both production tubing and auxiliary conduits therein, the tubing member can be manufactured easily and at low cost by a simple extrusion process. A solid plastic core formed by extrusion in a unitary casing also provides good protection for electrical lines, hydraulic lines and other communication lines in the conduit. By further arranging the unitary casing to be square in cross-section, the conduits and the tubing passage can be balanced between opposing parallel sides of the square cross-section of the casing so as to balance the tension applied to the conduit and the tubing passage when winding the tubing member onto a spool. This avoids the extra cost associated with spiraling configurations required in the prior art.

This umbilical provides the electricity to drive the pump in the case of an ESP or hydraulic fluid to drive the pump in the case of an HSP, as well as the production tube to evacuate fluids and gases from the well bore via the pump.

This umbilical will be in a square, or rectangle form consisting of multiple tubulars (plastic and steel) as well as, but not limited to, electrical wiring, support cables, fibre optics, or chemical injection, etc. All of these materials will be encapsulated into one solid umbilical string.

In this system, the electrical wires or hydraulic lines, as well as the production tubing are all housed inside a square or rectangle umbilical tubing member. This umbilical is then injected into the well bore continuously with the pump on the end. This removes the need for expensive armor coatings, and significantly speeds up the operation.

The unitary casing preferably comprises a solid core of plastic material locating the tubing passage and the auxiliary conduit in respective bores in the solid core.

The unitary casing preferably comprises an extruded member.

The unitary casing is preferably rectangular in cross section.

The tubing passage and said at least one auxiliary conduit preferably each have a central axis positioned such that the central axes are equidistant to a flat outer surface of the casing relative to one another.

When provided in combination with a spool supported for rotation about an axis of rotation, the tubing member is preferably wound onto the spool such that said flat outer surface, relative to which the central axes are equidistant, is parallel to the axis of rotation of the spool.

The tubing passage and said at least one auxiliary conduit are preferably parallel to at least one flat outer surface of the casing.

The tubing passage and said at least one auxiliary conduit are preferably parallel to one another and spaced apart from one another along the length of the casing.

There may be provided plastic production tubing lining the tubing passage along the length of the casing in which the production tubing is arranged to receive produced fluids from a well operation therethrough. Alternatively, there may be provided metallic production tubing lining the tubing passage along the length of the unitary casing.

When provided in combination with a submersible pump which communicates production fluids into the production tubing passage, said at least one auxiliary conduit preferably receives control lines arranged for operating the pump therethrough.

When the submersible pump comprises an electrical submersible pump, said at least one auxiliary conduit preferably receives electrical lines therethrough.

Alternatively, when the submersible pump comprises a hydraulic submersible pump, said at least one auxiliary conduit preferably comprises a pair of auxiliary conduits communicating hydraulic fluid therethrough to control the pump.

Said at least one auxiliary conduit may also receive various electrical supply wires therethrough for supplying power or control to various other downhole equipment. Said at least one auxiliary conduit may also receive fibre optic lines, e-lines, slick lines, or capillary tubes therethrough. Alternatively or in addition to, said at least one auxiliary conduit may comprise a pair of conduits communicating hydraulic fluid therethrough.

The auxiliary conduit may receive a plurality of auxiliary lines therethrough which are helically twisted about a central axis of the auxiliary conduit.

When the auxiliary conduit comprises a plurality of auxiliary conduits spaced apart along a common diametrical axis of the tubing passage, the unitary casing of the tubing member is preferably wound onto a spool such that the common diametrical axis of the tubing passage is oriented parallel to an axis of rotation of the spool.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a tubing member generally indicated by reference numeral 10. The tubing member is particularly suited for use as a tubing string, for example an umbilical string in communication with a submersible pump 12 or for other various well operations. The tubing member serves both the function of production tubing and includes means for controlling the pump or other downhole tools to which it is connected.

Figure 1:
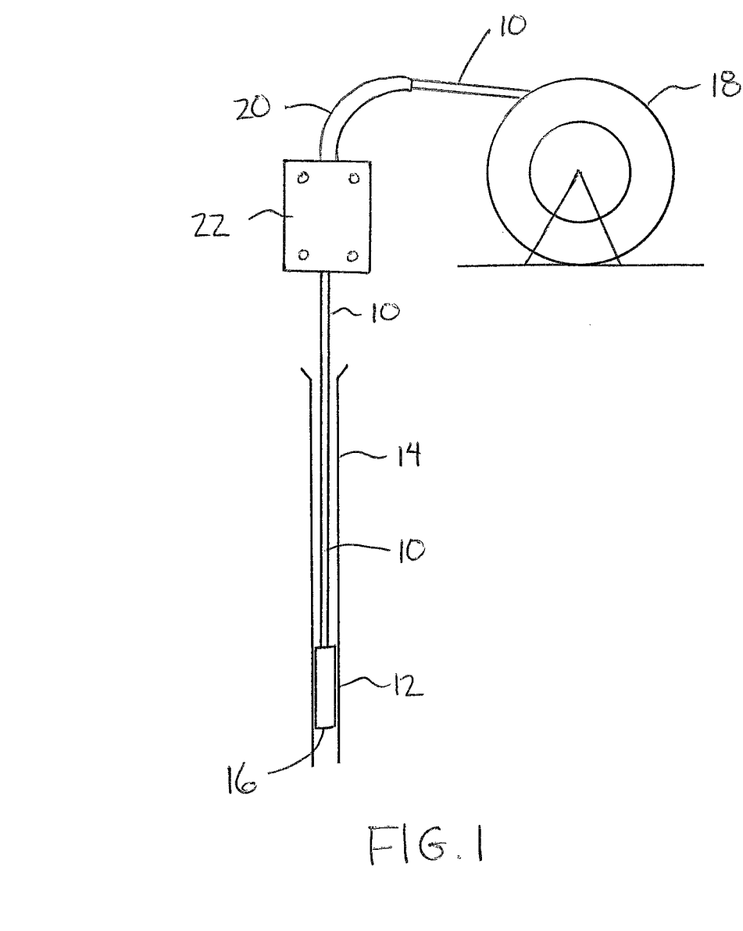
FIG. 1 is a schematic illustration of the tubing member inserted into a well casing from a spool using a tubing injector style.
Figure 2:
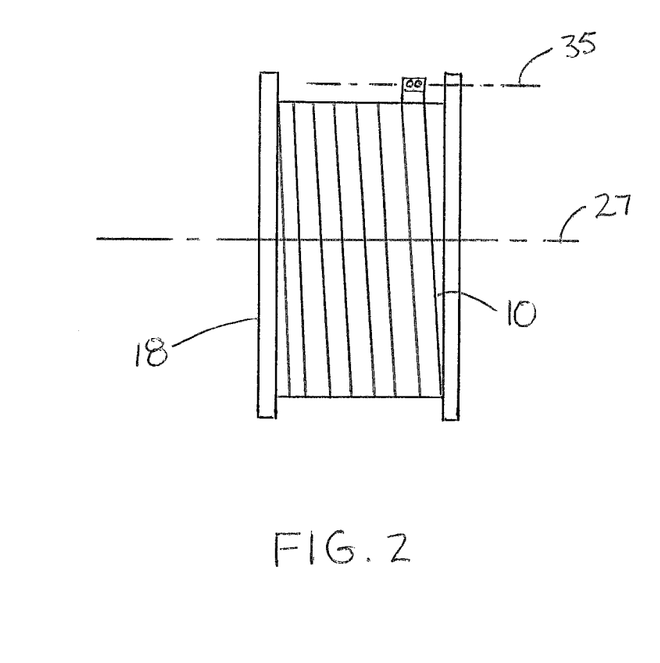
FIG. 2 is an elevational view of a spool upon which the tubing member is wound.

As shown in FIG. 1, the outer casing 14 of a well bore receives the elongate tubing member extending longitudinally therethrough. In the illustrated embodiment, the pump 12 comprises a submersible pump 16 coupled to the bottom end of the tubing member 10 for communicating through the tubing member to the surface. The tubing member 10 is flexible for being housed on a suitable spool 18 at the surface. The tubing member is unwound from the spool 18 and guided by a suitable guide arch 20 into a coiled tubing injector 22 above the well head which serves to inject the tubing from the spool 18 into the well bore casing 14.

Though various embodiments of the tubing member are described and illustrated herein, the common features of the various embodiments will first be described.

The tubing member comprises a unitary solid core casing which is integrally formed of unitary material by an extrusion process. Plastic material, for example polyurethane, nylon, neoprene and the like can be extruded to form the unitary solid core casing 26 of the tubing member. The casing is rectangular in cross section so as to define two pairs of diametrically opposed and parallel flat outer surfaces extending in the longitudinal direction the length of the tubing member. Typical dimensions of the casing may be in the order of one to six inches by one to six inches. The flat configuration of the outer surfaces permits winding onto the spool such that one of the opposed pairs of the flat surfaces remain parallel to an axis of rotation 27 of the spool.

The solid core casing 26 includes a tubing passage 30 formed therein to extend in the longitudinal direction of the tubing member parallel to the outer surfaces 28 thereof. Steel or plastic production tubing 32 which is sufficiently flexible for being spooled, forms a liner which lines the tubing passage 30 to extend through the passage the length of the tubing member. The tubing passage 30 thus forms a bore in the solid core of the casing which receives the tubing 32 therein by extruding the casing about the tubing 32.

At least one auxiliary conduit 34 is also formed in a respective bore extending in the longitudinal direction of the tubing member through the casing 26. A central axis of the conduit 34 and a central axis of the tubing passage 30 are arranged to be centrally located equidistantly between one of the opposed pairs of outer surfaces of the casing so that the center of the conduit and the center of the passage 30 are equidistant from at least one outer surface 28 of the casing. A diametric line drawn 35 between the centers of the conduit 34 and the passage 30 thus lies parallel to said one of the outer surfaces 28 of the casing. The conduit 34 and the passage 30 remain parallel to one another and the outer surfaces 28 of the casing along the length thereof.

Each conduit 34 is arranged to receive respective auxiliary lines therethrough which may include electrical supply wires, communications lines such as fibre optics, hydraulic control lines, an e-line, or a slick line, for example.

The auxiliary lines of each conduit 34 and the production tubing 32 of the tubing passage 30 are oriented parallel and spaced apart and are pulled together through the extrusion process forming the surrounding casing 26 such that the casing is simultaneously and integrally formed about the auxiliary lines and the production tubing 32. When there are a plurality of conduits 34 receiving auxiliary lines therethrough, the conduits 34 are located at spaced positions along a common diametrical axis 35 of the production tubing passage so that a centre of each conduits and passage is equidistant from the two opposite faces of the casing which are parallel to the spool axis of rotation. In this manner, the diametrical axis of the production tubing, which also extends diametrically through each of the conduits 34, is also oriented parallel to said two opposite faces of the casing and the axis of rotation of the spool.

Other conduits may be provided in addition to the auxiliary conduit 34 in which the center of the other conduits are not necessarily equidistant to one of the outer surfaces as compared to the tubing passage 30. Providing auxiliary lines in the other conduits having a sufficiently high tensile strength overcomes the problem of different tensile forces being applied to different parts of the tubing member as it is spooled and dispensed.

Turning now to the embodiments in FIGS. 3 through 6, a single auxiliary conduit 34 is provided which has its center aligned with the center of the tubing passage 30 so as to be equidistant from one of the outer surfaces 28.

Figure 3:
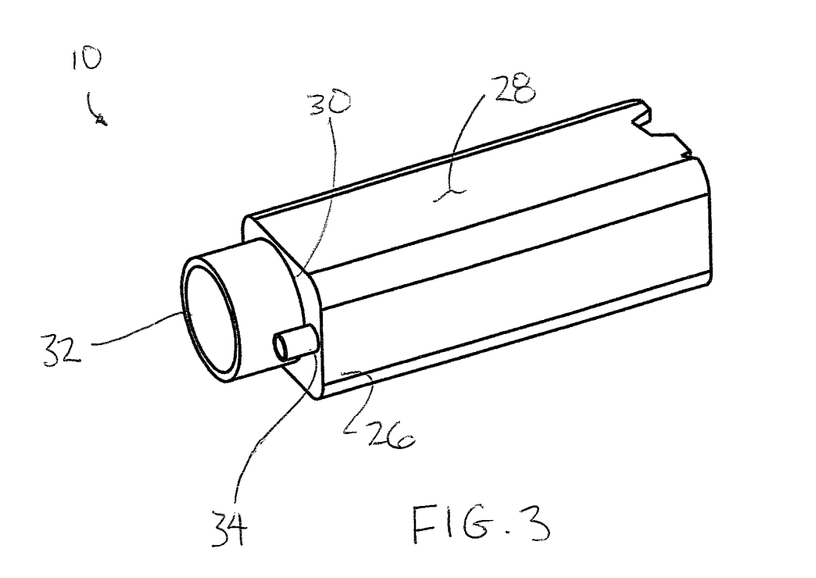
FIG. 3 is a partly sectional perspective view of a first embodiment of the tubing member.
Figure 4:
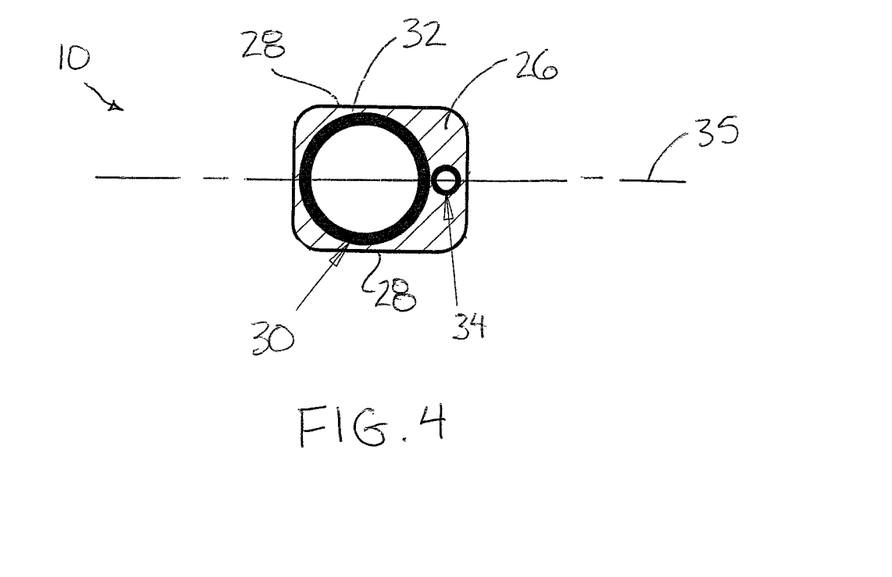
FIG. 4 is a sectional end view of the tubing member according to FIG. 3.

According to the embodiment of FIGS. 3 and 4, the single conduit 34 includes a tubular lining of flexible material to permit spooling, for example a stiff plastic material. The tubular lining thus forms a suitable tubular passage so that the conduit 34 can receive various configurations of control lines therethrough for controlling downhole equipment.

Figure 5:
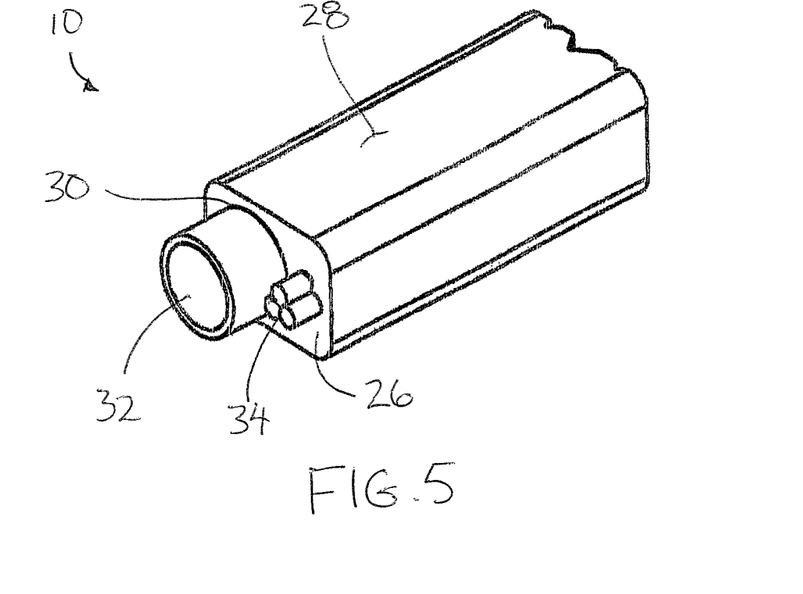
FIG. 5 is a partly sectional perspective view of a second embodiment of the tubing member.
Figure 6:
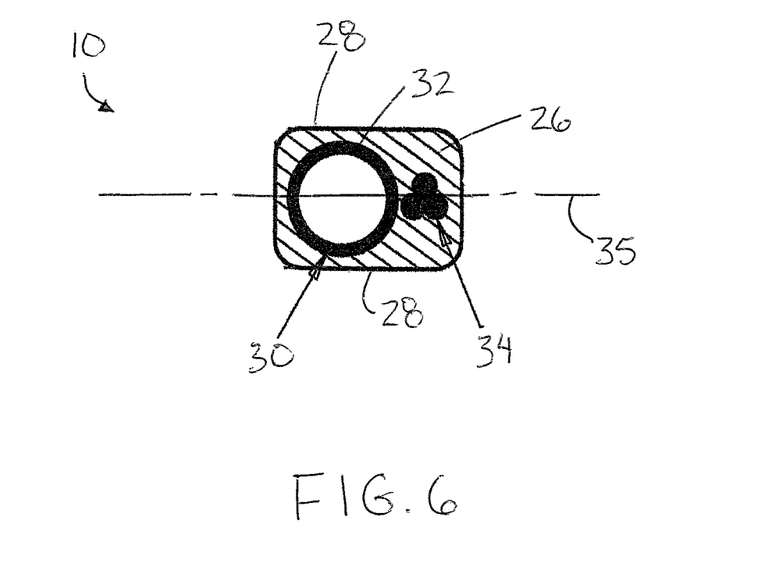
FIG. 6 is a sectional end view of the tubing member according to FIG. 5.

Alternatively, as shown in FIGS. 5 and 6, the single conduit 34 includes a plurality of communication lines extending therethrough which form a twisted or spiraling bundle 38. The bundle 38 is spiraled or twisted about a central axis centrally aligned with the center of the conduit 34 which remains equidistant to one of the outer surfaces 28 relative to the center of the passage 30.

These embodiments are particularly suited for use in combination with an Electrical Submersible Pump in which the communication lines comprise electrical lines in connection with the pump 16 and which are arranged for controlling operation of the pump from a suitable control at the surface, at a top end of the well casing to which the communication lines are in connection.

In a further embodiment, a pair of conduits may be provided on diametrically opposed sides of the tubing passage 30 so that both conduits 34 and the tubing passage 30 all have a center axis which is equidistant to one of the outer surfaces 28 of the rectangular cross section casing. Each of the plurality of conduits 34 when there is provided a pair of conduits 34 may be provided with a twisted bundle 38 of communication lines which may comprise electrical lines or fibre optics, etc. as described above.

In yet further embodiments, the pair of conduits 34 are spaced apart along the common diametrical axis on a common side of the production tubing. In this instance, a plurality of conduits 34 may be provided at various radial spacings from the tubing passage 30 but on a common side of the tubing passage while again remaining equidistant between their respective centers and one of the outer surfaces 28 of the rectangular casing.

In further embodiments as described below with regard to FIGS. 15 through 18, a pair of the conduits 34 may be positioned either to one side of the production tubing or on diametrically opposed sides, but the conduits may instead comprise auxiliary lines in the form of hydraulic conduits for conducting hydraulic fluid therethrough. This configuration is particularly suited for use with a hydraulic submersible pump so that the conduits 34 serve to communicate hydraulic fluid therethrough to drive and operate the pump while the tubing passage 30 receives production tubing for communicating the pumped productions fluids back up to the surface.

Turning now to FIGS. 7 through 10, further embodiments of the tubing member are illustrated in which the auxiliary conduit 34 comprises a lining therein forming a tubular member with a fluid passage defined therethrough which is near in diameter to the diameter of the production tubing. This configuration is well-suited for use with a down hole pump 16 of the type comprising a jet pump. In this instance a pumping fluid is pumped downwardly through the auxiliary conduit 34 to collect produced fluids at the bottom end of the tubing member at the pump 16 so that the carrier fluid together with the produced fluids return up the production tubing in the tubing passage of the casing 26.

Figure 7:
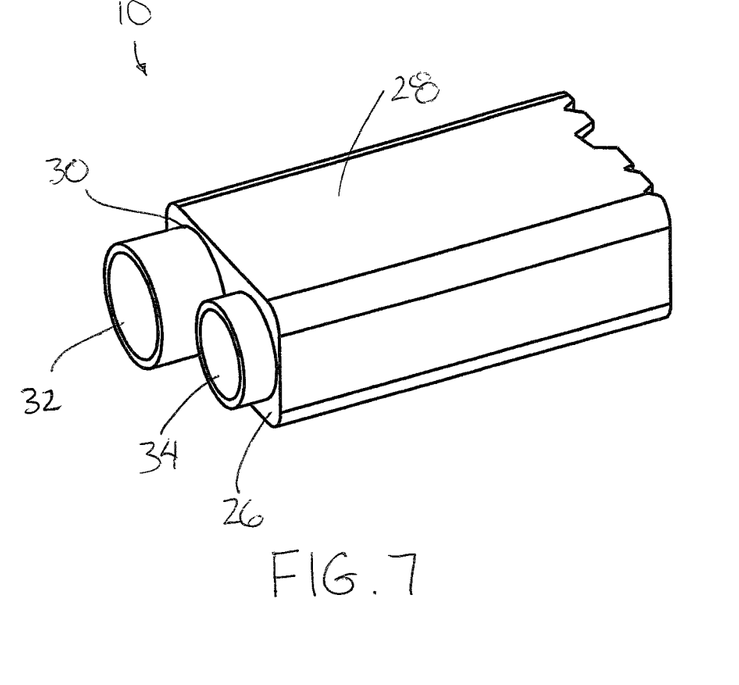
FIG. 7 is a partly sectional perspective view of a third embodiment of the tubing member.
Figure 8:
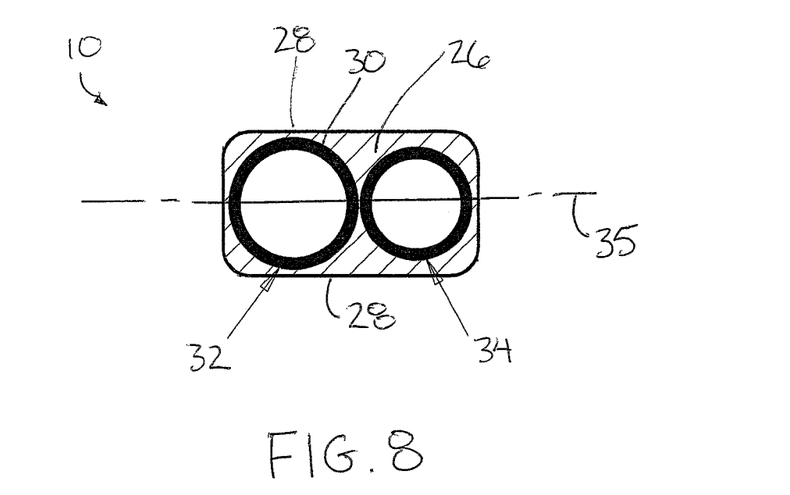
FIG. 8 is a sectional end view of the tubing member according to FIG. 7.
Figure 9:
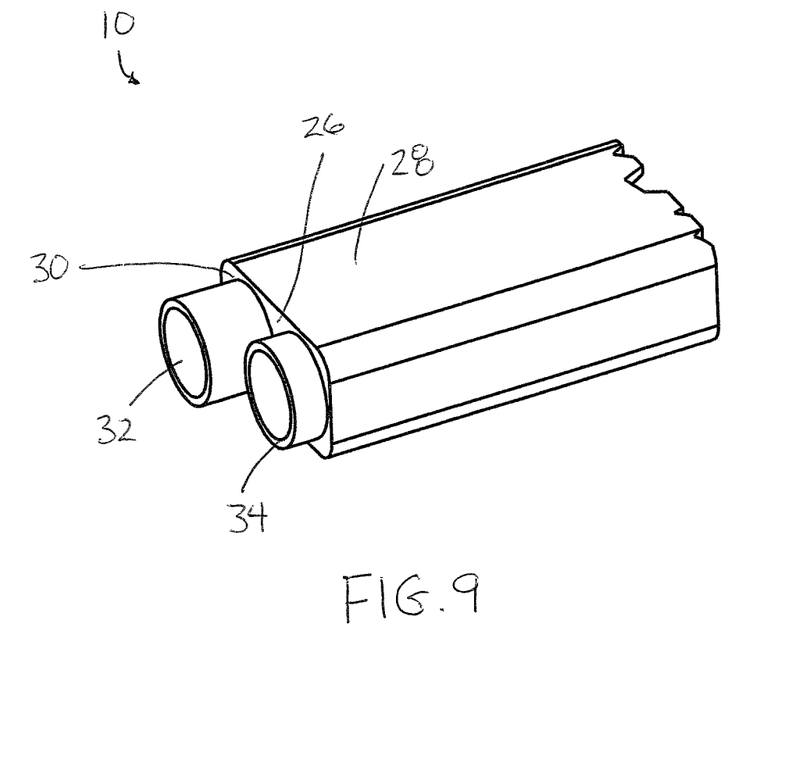
FIG. 9 is a partly sectional perspective view of a fourth embodiment of the tubing member.
Figure 10:
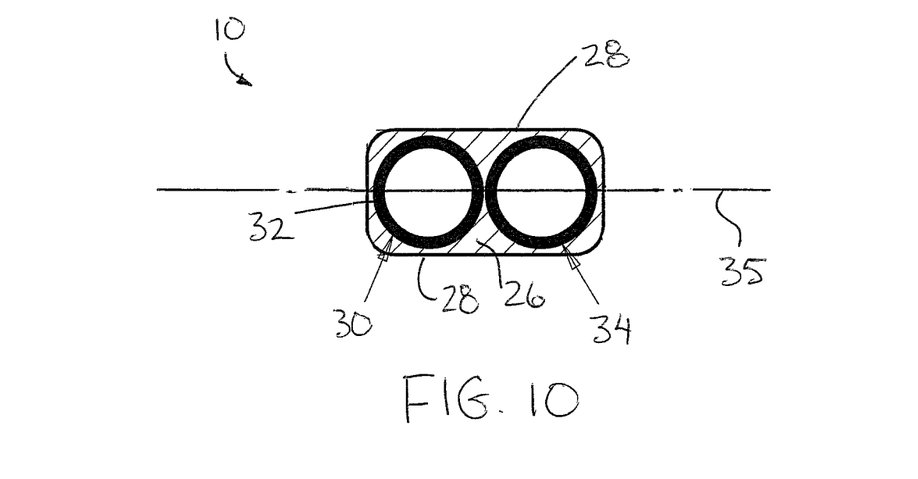
FIG. 10 is a sectional end view of the tubing member according to FIG. 9.

As shown in FIGS. 7 and 8, the auxiliary conduit and the tubing passage may differ in diameter so that one receives a plastic pipe of 1½ inches in diameter for example while the other receives a carbon steel tube of 1¾ inches in diameter therethrough so that the production tubing and the auxiliary conduit are also lined with different materials. As shown in FIGS. 9 and 10, the production tubing passage receiving the tubing therein and the auxiliary conduit receiving the auxiliary line therethrough can receive pipes or tubes extending therethrough having the same diameter and which are either formed of the same material or different material, for example plastic or metal.

Turning now to FIGS. 11 through 14, a further configuration of the tubing member is shown. In addition to the production tubing extending through the tubing passage, the unitary casing is also provided with two auxiliary conduits 34 extending therethrough. In both instances one of the auxiliary lines received through the auxiliary conduits is near in diameter to the production tubing while the other auxiliary line received through a respective auxiliary conduit is much smaller in diameter. For example the smaller auxiliary line may be in the range of ¼ inch to ½ inch in diameter while the production tubing and other auxiliary line in its respective auxiliary conduit may be in the range of 1 inch to 1½ inches in diameter. As shown in the illustrated embodiments, the smaller auxiliary conduit is situated between the production tubing and the larger auxiliary conduit with the centers of the conduits and production tubing remaining equidistant to two opposing faces of the surrounding casing.

Figure 11:
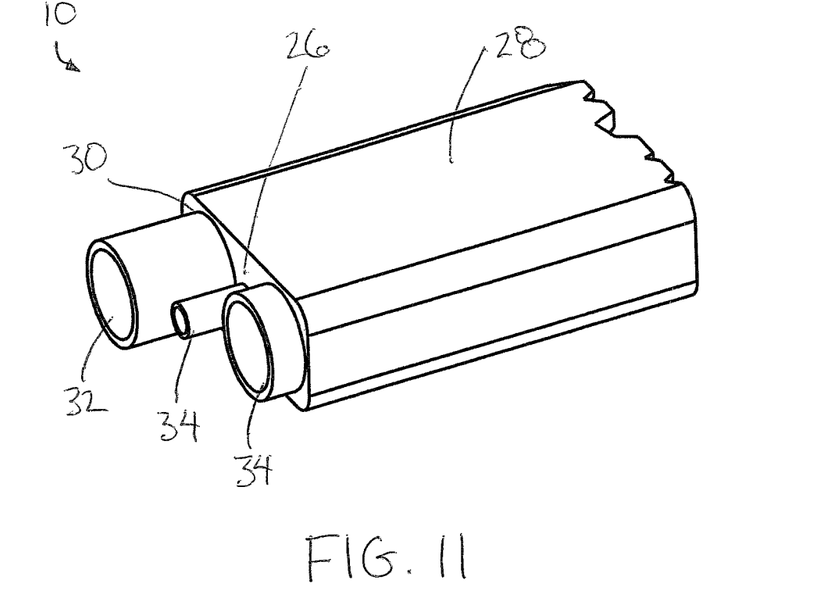
FIG. 11 is a partly sectional perspective view of a fifth embodiment of the tubing member.
Figure 12:
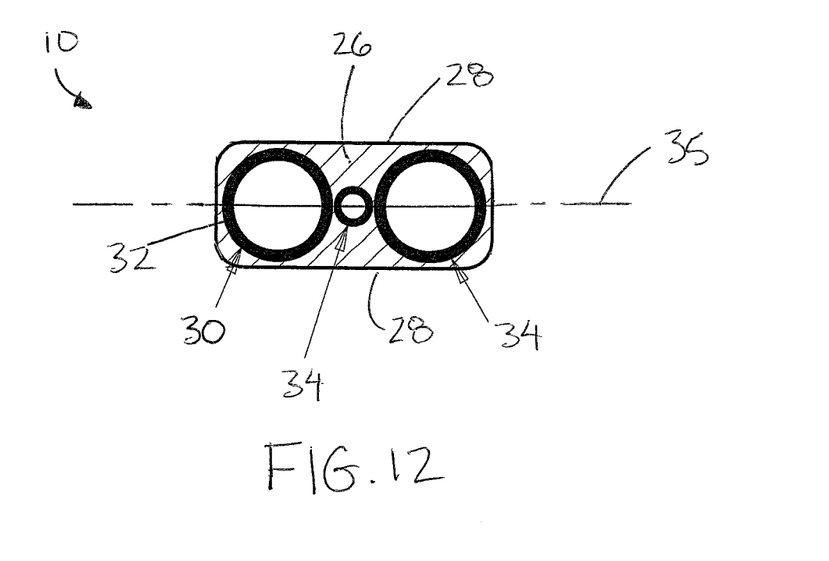
FIG. 12 is a sectional end view of the tubing member according to FIG. 11.
Figure 13:
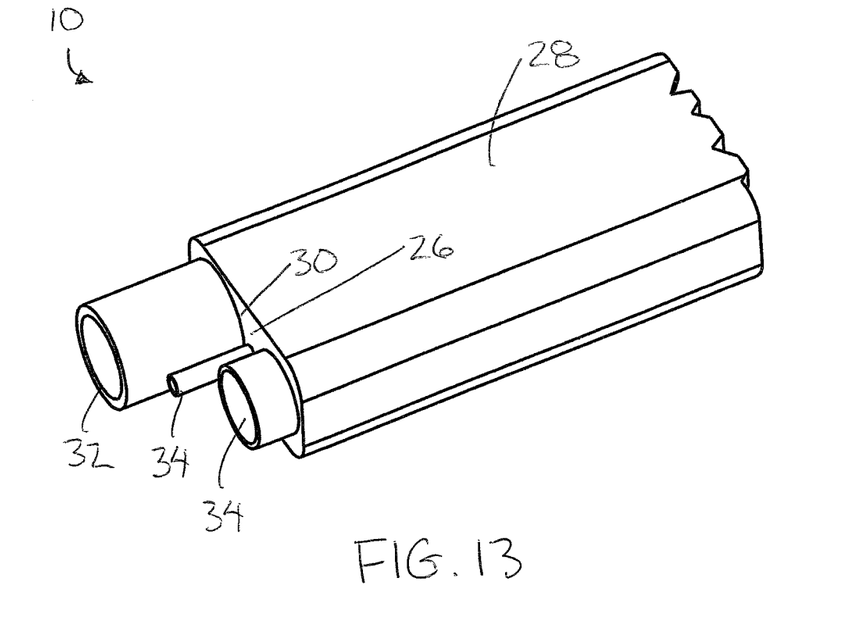
FIG. 13 is a partly sectional perspective view of a sixth embodiment of the tubing member.
Figure 14:
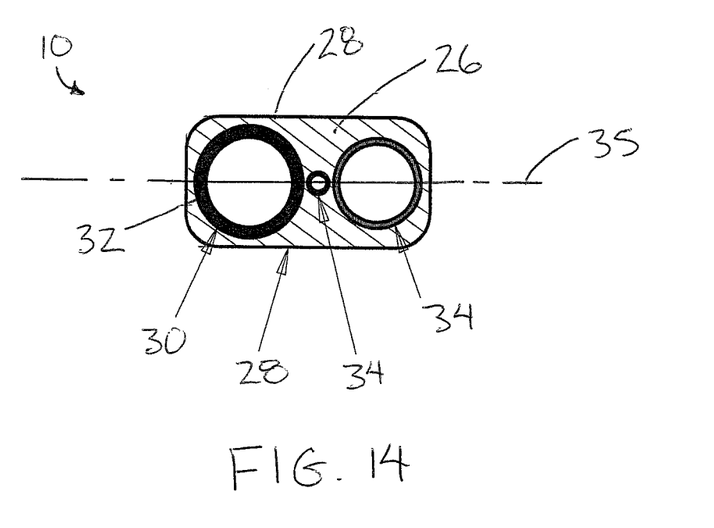
FIG. 14 is a sectional end view of the tubing member according to FIG. 13.

Turning more particularly to FIGS. 11 and 12, both the production tubing and the larger auxiliary line on opposing sides of the smaller auxiliary line may be identical in diameter and may be formed of same or different materials such as steel or plastic. Alternatively as shown in FIGS. 13 and 14, the auxiliary conduit which is larger and near in size to the production tubing may still be slightly larger or slightly smaller in diameter while similarly being formed of similar or different materials for example steel or plastic.

The tubing members shown in FIGS. 11 through 14 are suited for use with a jet pump in which the larger auxiliary conduit near in diameter to the production tubing is used to pump a carrier fluid down for collecting produced fluids similarly to the embodiments of FIGS. 7 through 10. In this instance the smaller auxiliary line received in the auxiliary conduit in the center of the tubing member can be used to receive various communication lines therethrough including electrical, hydraulic or fibre optics and the like for controlling additional down hole equipment or sensors. Alternatively this configuration of tubing member may provide electrical controls for an electrical submersible pump through the smaller central auxiliary conduit so that produce fluids are pumped up the production tubing while the larger auxiliary conduit is used for selectively injecting fluids into the well as may be required.

Figure 15:
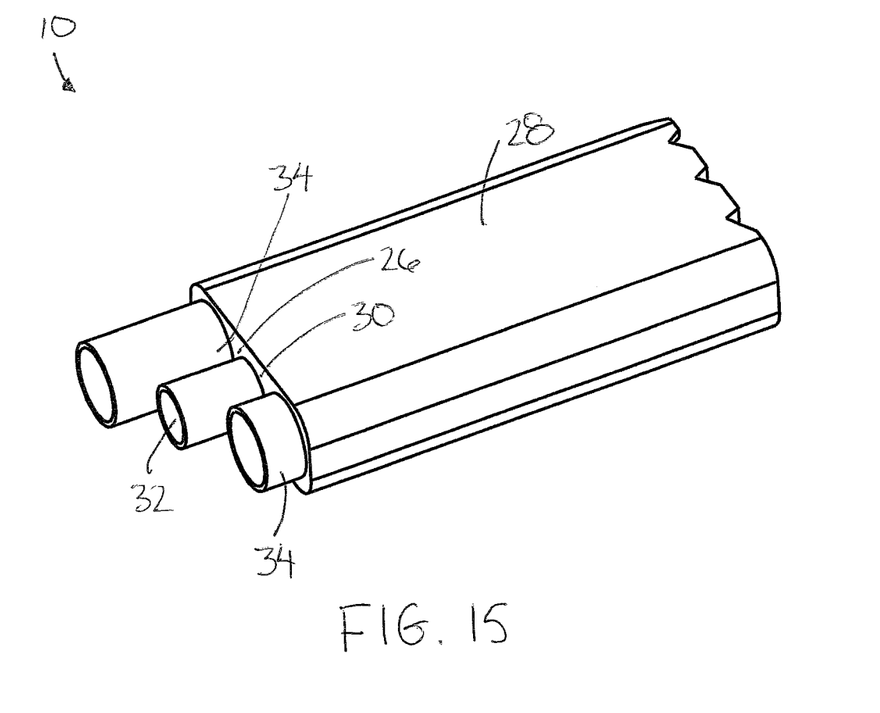
FIG. 15 is a partly sectional perspective view of a seventh embodiment of the tubing member.
Figure 16:
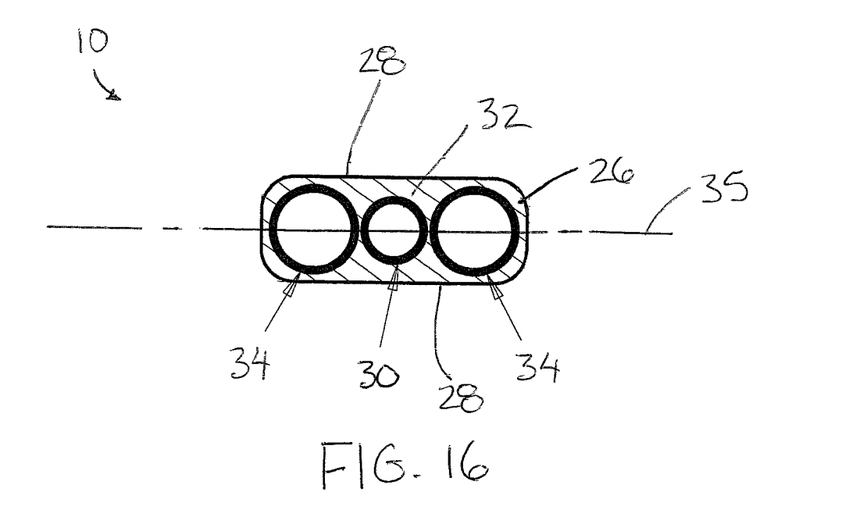
FIG. 16 is a sectional end view of the tubing member according to FIG. 15.

Turning now to FIGS. 15 through 18, in a further embodiment of the tubing member, two auxiliary conduits are provided having an auxiliary line in the form of tubing extending therethrough which is near in diameter to the diameter of the production tubing. More particularly as shown in FIGS. 15 and 16, the two auxiliary lines are slightly larger in diameter than the production tubing centrally located therebetween, for example the tubing of the auxiliary lines may be 1 inch in diameter while the production tubing is % of an inch in diameter with the auxiliary conduits being formed of steel while the production tubing is formed of steel or plastic. This embodiment is particularly suited for use with a hydraulic submersible pump in which fluid in two auxiliary conduits is alternately pressurized to cause a reciprocating pumping action of the hydraulic submersible pump to which they are connected which in turn pumps a produced fluid up through the production tubing centrally located in the casing.

Figure 17:
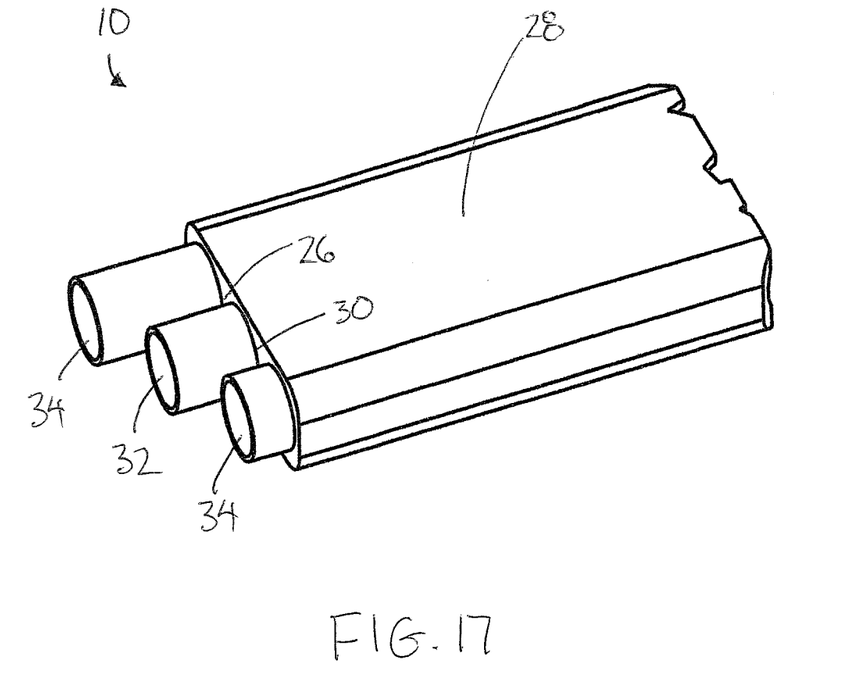
FIG. 17 is a partly sectional perspective view of an eighth embodiment of the tubing member.
Figure 18:
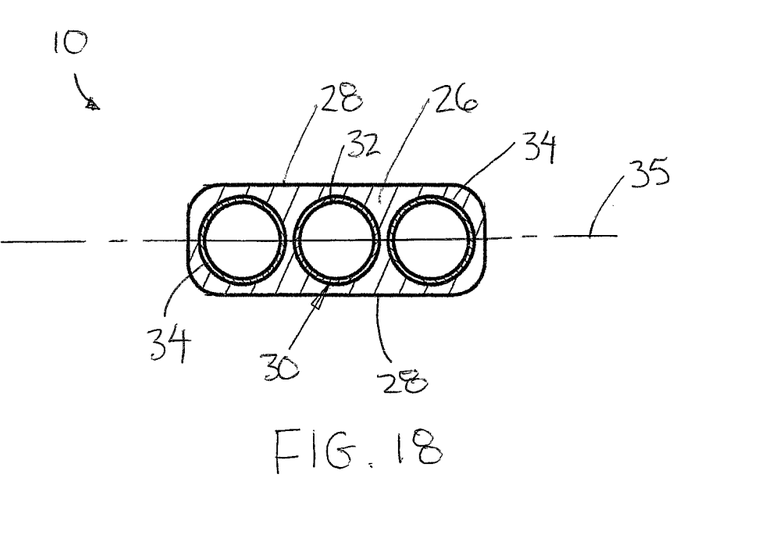
FIG. 18 is a sectional end view of the tubing member according to FIG. 17.

Alternatively as shown in FIGS. 17 and 18, the two auxiliary conduits may include tubing extending therethrough which is identical in diameter to the production tubing so that three lined passages extend through the unitary casing which are identical to one another. This configuration is also particularly suited for use with a hydraulic submersible pump. For example the two auxiliary lines extending through respective auxiliary conduits 34 conform a circuit with the pump 16 with which they are in communication so that hydraulic fluid is pumped down one of the conduits to drive the pump and returned up the other conduit to operate the pump which in turn pumps produced fluids up the production tubing 32. The diameter of the three identical tubing passages extending through the casing in this instance may be ¾ of an inch or an inch in diameter for example with all three tubing passages either being formed of steel, or metal or alternatively different ones of the passages may be formed of different materials.

In yet further embodiments, the casing of the tubing member may comprise a plurality of different types of conduits 34 in combination with the tubing passage 30 for operating combinations of hydraulic tools and electrical tools and the like. Examples of various tools which can be communicated with through the tubing member 10 include logging tools for temperature or pressure logging, video cameras, drill motors, and various directional tools. In each instance, by locating all of the various conduits 34 so that the longitudinally extending central axes thereof are parallel and equidistant to two parallel opposed faces of the surrounding casing, the tubing member can be wound onto a spool such that the tensile forces on the conduits and the tubing member are substantially equal.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A continuous tubing member in combination with a spool arranged to be supported for rotation about a spool axis of rotation and a submersible pump deployed in a wellbore for use in downhole well operations, the continuous tubing member consisting only of:
   a casing comprising a single, unitary material which is extruded to define extruded outer surfaces extending in a longitudinal direction of the continuous tubing member in which two of the extruded outer surfaces are opposed from one another;
   a production tubing passage formed in the casing to extend therethrough in the longitudinal direction and being arranged for connection to the submersible pump where the production tubing passage is such that it receives production fluids therethrough; and
   a plurality of auxiliary conduits formed in the casing separate from the production tubing passage and extending through the casing in the longitudinal direction;
   the plurality of auxiliary conduits being spaced apart along a common diametrical axis of the tubing passage which is substantially parallel to said two of the extruded outer surfaces which are opposed from one another such that the tubing passage and the plurality of auxiliary conduits are parallel to one another;
   the continuous tubing member being spooled onto the spool such that the diametrical axis and said two of the extruded outer surfaces which are opposed from one another are parallel to the spool axis of rotation; and
   at least one of the plurality of auxiliary conduits receiving a control line therethrough which is arranged for connection to the submersible pump to drive operation of the submersible pump;
   wherein all exterior surfaces of the continuous tubing member in the wellbore are defined solely by the extruded outer surfaces of the casing.

2. The member according to claim 1 wherein the single, unitary material of the casing comprises a solid core of plastic material locating the tubing passage and the auxiliary conduit in respective bores in the solid core.

3. The member according to claim 1 wherein the unitary casing is rectangular in cross section.

4. The member according to claim 1 wherein said two of the extruded outer surfaces which are opposed from one another are flat and the tubing passage and the plurality of auxiliary conduit each have a central axis positioned such that the central axes are equidistant to one of said two of the extruded outer surfaces of the casing relative to one another.

5. The member according to claim 1 wherein there is provided plastic production tubing lining the tubing passage along the length of the casing, the production tubing being arranged to receive produced fluids from a well operation therethrough.

6. The member according to claim 1 wherein there is provided metallic production tubing lining the tubing passage along the length of the unitary casing, the production tubing being arranged to receive produced fluids from a well operation therethrough.

7. The member according to claim 1 wherein the submersible pump comprises a hydraulic submersible pump and said at least one of the plurality of auxiliary conduits comprises a pair of the plurality of auxiliary conduits which receive respective control lines therein arranged for communicating hydraulic fluid therethrough to control the pump.

8. The member according to claim 1 wherein at least one of the plurality of auxiliary conduits receives electrical supply wires therethrough.

9. The member according to claim 1 wherein at least one of the plurality of auxiliary conduits receives fibre optic lines therethrough.

10. The member according to claim 1 wherein at least one of the plurality of auxiliary conduits receives a plurality of auxiliary lines therethrough which are helically twisted about a central axis of said at least one auxiliary conduit.

11. A continuous tubing member in combination with a spool arranged to be supported for rotation about a spool axis of rotation for use in downhole well operations, the continuous tubing member consisting only of:
   a production tubing defining a production tubing passage extending in a longitudinal direction of the continuous tubing member and being arranged to receive produced fluids from a well therethrough;
   a pair of auxiliary conduits each having a respective central axis extending in the longitudinal direction and being arranged to communicate pumped hydraulic fluids therethrough; and
   a casing consisting solely of a solid body of a single, unitary, extruded material which integrally surrounds the production tubing and the auxiliary conduits to define extruded outer surfaces extending in the longitudinal direction of the continuous tubing member in which two of the extruded outer surfaces are flat and opposed from one another;
   the auxiliary conduits being positioned relative to the production tubing such that: the central axis of each auxiliary conduit lies on a common diametrical axis of the production tubing;
   the production tubing and the auxiliary conduits are positioned at spaced apart locations along the common diametrical axis; and
   said two of the extruded outer surfaces which are flat and opposed from one another are oriented parallel to the common diametrical axis; and
   the continuous tubing member being spooled onto the spool such that the diametrical axis of the production tubing lies parallel to the spool axis of rotation of the spool;
   wherein all exterior surfaces of the continuous tubing member in the wellbore are defined solely by the extruded outer surfaces of the casing.

12. A tubing member for use in well operations consisting only of:
   a production tubing defining a production tubing passage extending in a longitudinal direction of the tubing member and being arranged to receive produced fluids from a well therethrough;
   at least one auxiliary conduit having a respective central axis extending in the longitudinal direction and being arranged to receive an auxiliary line therethrough; and
   a casing consisting solely of a solid body of a single, unitary, extruded material which integrally surrounds the production tubing and said at least one auxiliary conduit to define two opposing, extruded, outer surfaces extending in the longitudinal direction of the tubing member;
   the two opposing, extruded, outer surfaces of the casing being oriented substantially parallel to a prescribed diametrical axis of the production tubing; and
   said at least one auxiliary conduit being positioned relative to the production tubing such that the central axis of said at least one auxiliary conduit lies on the prescribed diametrical axis of the production tubing and said at least one auxiliary conduit is spaced apart along the prescribed diametrical axis from the production tubing.

13. The tubing member according to claim 12 wherein the two opposing, extruded, outer surfaces of the casing comprise flat surfaces such that the two opposing, extruded, outer surfaces are uninterrupted in the longitudinal direction of the tubing member.

14. The tubing member according to claim 13 in combination with a spool arranged to be supported for rotation about a spool axis of rotation wherein:
   said at least one auxiliary conduit comprises a pair of auxiliary conduits each having a respective central axis extending in the longitudinal direction and being arranged to communicate pumped hydraulic fluids therethrough; and
   the auxiliary conduits are positioned relative to the production tubing such that the two opposing, extruded, outer surfaces of the casing are oriented parallel to the common diametrical axis; and
   the tubing member is spooled onto the spool such that the common diametrical axis of the production tubing lies parallel to the spool axis of rotation of the spool.

* * * * *